(12) United States Patent
Van Creveld

(10) Patent No.: US 11,348,065 B2
(45) Date of Patent: May 31, 2022

(54) SYSTEMS AND METHODS FOR AN INTERNAL PRIVATE ONLINE MARKETPLACE

(71) Applicant: Donald Van Creveld, Redwood City, CA (US)

(72) Inventor: Donald Van Creveld, Redwood City, CA (US)

(*) Notice: Subject to any disclaimer, the term of this patent is extended or adjusted under 35 U.S.C. 154(b) by 0 days.

(21) Appl. No.: 16/804,344

(22) Filed: Feb. 28, 2020

(65) Prior Publication Data

US 2020/0279213 A1 Sep. 3, 2020

Related U.S. Application Data

(60) Provisional application No. 62/812,369, filed on Mar. 1, 2019.

(51) Int. Cl.
| | | |
|---|---|---|
| *G06Q 10/08* | (2012.01) | |
| *G06F 16/9035* | (2019.01) | |
| *G06Q 30/02* | (2012.01) | |
| *G06Q 30/06* | (2012.01) | |

(52) U.S. Cl.
CPC ....... *G06Q 10/087* (2013.01); *G06F 16/9035* (2019.01); *G06Q 30/0206* (2013.01); *G06Q 30/0641* (2013.01)

(58) Field of Classification Search
CPC .. G06F 16/532; G06F 16/583; G06F 16/9035; G06Q 30/0643; G06Q 10/087
See application file for complete search history.

(56) References Cited

U.S. PATENT DOCUMENTS

| | | |
|---|---|---|
| 7,282,897 B2 | 10/2007 | Moussaoui et al. |
| 8,111,923 B2 | 2/2012 | Csurka |
| 8,494,285 B2 | 7/2013 | Zhang |
| 8,756,233 B2 | 6/2014 | Abdalmageed |
| 8,873,812 B2 | 10/2014 | Larlus-Larrondo et al. |
| 2013/0083999 A1* | 4/2013 | Bhardwaj ............ G06K 9/4652 382/165 |
| 2014/0067603 A1* | 3/2014 | Okoro ................ G06Q 30/0643 705/26.35 |

(Continued)

FOREIGN PATENT DOCUMENTS

WO 2016197303 A1 12/2016

OTHER PUBLICATIONS

Debuc, 'A Review of Algorithms for Segmentation,' Chap. 2, Image Segmentation, 2011, Ed. P.-G. Ho, InTech, 15-54.

(Continued)

*Primary Examiner* — A. Hunter Wilder
(74) *Attorney, Agent, or Firm* — Donald Douglas-Hamilton

(57) ABSTRACT

Systems, methods, and articles of manufacture for an internal private online marketplace are presented. Some embodiments described herein may include a method which may involve (1) identifying one or more items listed in one or more databases, and (2) generating a transfer protocol between the destination entity that desires to possess the one or more items with that of the source entity that possesses or has responsibility over the one or more items. The desired items may be identified by characteristics. Various other methods, systems, and computer-readable media are also disclosed.

18 Claims, 5 Drawing Sheets

(56) References Cited

U.S. PATENT DOCUMENTS

2017/0262914 A1 9/2017 Okoro et al.
2018/0357656 A1* 12/2018 Courtot .............. G06Q 30/0214

OTHER PUBLICATIONS

Canny, 'A Computational Approach to Edge Detection,' 1986, IEEE Trans. Pattern Anal. Mach. Intell., PAMI-8(6), 679-698.
Kovesi, 'Phase Congruency Detects Corners and Edges,' 2003, The Australian Pattern Recognition Society, Proc. DICTA, 309-318.
Duda et al., Unsupervised Learning and Clustering, 2001, Wiley, ISBN 0471056693.
Mori et al., Optical Character Recognition, 1999, Wiley, ISBN 047130819-6.

* cited by examiner

SYSTEMS AND METHODS FOR AN INTERNAL PRIVATE ONLINE MARKETPLACE

CROSS-REFERENCE TO RELATED APPLICATIONS

This application claims the benefit of the following United States provisional patent application with serial number U.S. 62/812,369 entitled SYSTEMS AND METHODS FOR AN INTERNAL ONLINE MARKETPLACE, filed 1 Mar. 2019. The disclosures of this provisional application are hereby incorporated by reference herein in its entirety.

TECHNICAL FIELD

The present disclosure generally relates to systems and methods of a private internal online marketplace.

BACKGROUND

Very large commercial enterprises or large institutions are usually divided up into several separate administrative components or entities, such as subsidiaries, branches, divisions, departments, etc. Often these entities have separate administrative environments involving inventories of parts (new, spare), used items, used components, etc. Some of these items may be of a legacy nature, thus may not currently be used in the latest or future versions of products and/or services. Alternatively, some of these items may be spares that are used to maintain active legacy hardware or software activities. The items may also be unused, as in surplus.

Oftentimes, the various entities of large enterprises/institutions utilize different inventory management systems and may not be aware of excess or shortage situations for materials, items, components within other entities of the enterprise/institution as a whole. In such large enterprises/institutions, different entities of an enterprise may not easily communicate with each other regarding such disused or spare inventory items that may be available for use elsewhere. This leads to waste in procurements or associated activities for the enterprise/institution as a whole, as separate entities do not possess an easy mechanism to identify the availability of desired components elsewhere within the various entities of the enterprise/institution. In the context of the present discourse, the term "enterprise/institution" refers to either an enterprise, such as a commercial conglomerate or concern, while institution refers to a non-commercial operation such as a university, research or public organization. In other words, the association as written herein, 'enterprise/institution,' indicates an 'or' and not an 'and.'

SUMMARY

As will be described in greater detail below, the present disclosure describes embodiments in which an internal private online marketplace facilitates the re-distribution of unused/spare parts, items, constituents of items within the various entities that are part of a large enterprise/institution.

Some embodiments described herein may include a method which may involve (1) identifying one or more available items listed in one or more databases, and (2) generating a transfer protocol between the destination entity that desires to acquire the one or more items with the source entity that possesses or has responsibility over the one or more items that may be in an "unwanted" inventory of the source entity. The transfer protocol may list a set of actions to be taken by one or more of the three parties involved under the rubrik of pre-conditions, established beforehand. An entity may be external, e.g., a non-profit organization or an external marketplace, or the entity may be internal, meaning a subsidiary or branch, etc. of the enterprise/institution, or the enterprise/institution itself.

The desired items may be identified by one or more characteristics. Such characteristics may include identifications of one or more components in each distinct constituent of the one or more items, one or more identity markings, descriptions of items such as function. Identity markings may include a manufacturer's identification or logo, date of manufacture, version number, SKU, an operational range, IMEI, or model number. RFID information may also be an identity marking. Additional characteristics that may be used in the searching process include one or more condition metrics, physical location(s) where the one or more item(s) may be found, or one or more possible cost metrics involving a transfer between the source and the destination entities.

It may be that a particular item has several distinct model numbers, for example, but the item itself has the same design and/or function. This situation might arise from a first company manufacturing an item, in which the manufacturing of that item is transferred to a second company which may then change its identity markings. Alternatively, the first company may be merged, bought, or assimilated into the second company, which then changes the identity markings of items produced by the first company.

In some embodiments, the method may further provide that the transfer protocol includes at least one of a re-distribution of at least a portion of the one or more items from one or more source locations to one or more destination locations. The transfer protocol may also include one of an ownership transfer, a transfer of at least a portion of the items to an external marketplace, a transfer of the responsibility for the portion, transfer to a second online internal marketplace, a budgetary transfer of the portion, a physical, or an outright purchase of the portion.

In an embodiment, a system for negotiating a transfer protocol concerning one or more items identified by a destination entity may include (i) a user-authorization module, stored in memory, which may allow certain users or agents access to one or more databases containing characteristics of items which may be available for transfer or re-location within the enterprise/institution; (2) a user-interface module, stored in memory, which may provide a user or agent with the various interactive functions within the system; (3) query module, stored in memory, which may allow an identification by, for example, a search query, of one or more items that fit one or more destination entity-provided characteristics; (4) a notification module, stored in memory, which may allow information found in one or more searches or queries of the one or more databases to be provided to a user or agent; the information provided may notify a user or agent one or more condition metrics, locations of one or more subsets of the one or more items, and/or cost metrics of the one or more items, or subsets thereof, located from, for example, by executing the query module; (5) a transfer protocol module, stored in memory, which may provide an outline of the transfer activities that may occur between source agent(s) and destination entity(-ies) and/or the enterprise/institution. Such a protocol may be based on pre-conditions set for the exchange of such items defined by at least one of the enterprise/institution, the source agent, and the destination entity; (6) a component identification module, stored in memory, which may process images of an item to discern the nature and perhaps condition of that item which may be placed into the source-unwanted inventory and the information determined by said component identification module may be stored in a database; and at least one processor to execute any one of these modules, and any additional modules that may be present within the system.

Pre-conditions which may be conflicting between the parties involved may be resolved in advance or automatically. For example, each of the two or three parties may rank the importance of a pre-condition or perhaps the relative importance of a set of pre-conditions. The latter may take the form that, e.g., the responsible entity for the organization of the relocation of an item from a source entity to a destination entity. The former may take the form of a ranking scheme, wherein each pre-condition is rated in importance separate from any other ranking of another pre-condition in a set of pre-conditions established or preferred by the defining entity. The pre-conditions may be approved in advance by a plurality of the players involved: one or both of the subsidiaries/entities and/or the enterprise/institution. Alternatively, conflicting pre-conditions, ones which address the same action or responsibility for an action, may be resolved by the precedence established by the enterprise/institution.

In some embodiments, other modules of the system may be available such as (7) an administrative module, stored in memory, which may provide access to one or more local databases, a central or a centralized database, or portions thereof. Additionally, the administration module may control the parameters of tasks associated with the bureaucracy and maintenance of the internal private online marketplace. User access to one or more of other modules may be granted via the administration module. Access may include, besides those of the databases, but also to ability to query certain categories of items using the query module and/or to receive notifications, or subsets of notification information, from the notification module. The administration module may also restrict the sources as to where the desired items may be found, meaning a restricted set of source locations. It may also restrict the set of destination locations for the items to be queried, by, for example, the query module.

A transport protocol module (8) may be also within the set of modules of the system. This module, stored in memory, may generate the set of guidelines for the involved entities/subsidiaries to accomplish the transfer of the one or more items therebetween. The guidelines may depend on the sets of pre-conditions that were established previously. The pre-conditions may have been devised or suggested by at least one of the enterprise/institution and one or both of the involved parties, such as the first subsidiary and the second subsidiary. If pre-conditions from the first subsidiary, for example, conflict with pre-conditions from the second subsidiary, then a resolution may be forthcoming from the enterprise/institution, or a pre-condition from the enterprise/institution may override, or take precedence, over one or both of the conflicting pre-conditions.

An additional module within the set of modules of the system may be a preferences module (9), stored in memory, in which a user or agent may preset a set of oft-used parameters such as characteristics of items used in queries, such as any preferred condition metrics, and/or preferred cost metrics, if applicable, for each item category desired. The preferences module may also store a subset of the source locations or entities of the enterprise/institution to be queried for one or more desired items. It may also store a subset of the destination locations allowed by the enterprise/institution.

In some examples, embodiments, or implementations, the above-described method may be encoded as computer-readable instructions on a non-transitory computer-readable medium. For example, a computer-readable medium may include one or more computer-executable instructions which, when executed by at least one processor of a computing device, may cause the computing device to (i) identify, one or more items, from one or more databases desired by a destination entity; (ii) generate a transfer protocol between the destination entity and a source agent; and (iii) communicate, distribute, or provide the transfer protocol to the parties involved.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
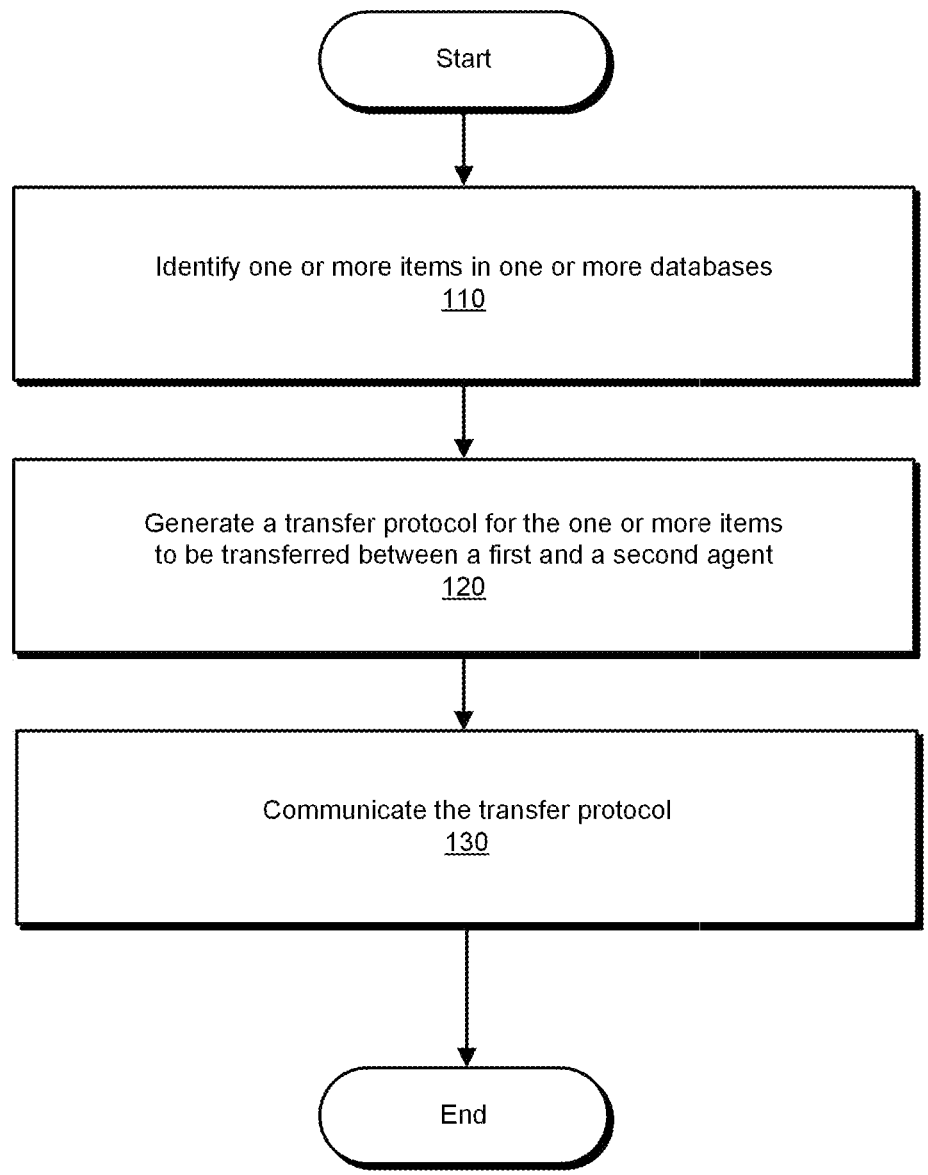
FIG. 1 depicts a flow diagram of an example method in accordance with some of the embodiments described in the present application.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods involving an internal private online marketplace that may permit identifying or locating one or more items, possessed by an entity, from one or more databases, and facilitate the generation of a transfer protocol between separate entities of a large bureaucratic arrangement, such as an enterprise or an institution. An entity might be a department, subsidiary, division, independent research unit, foreign subsidiary, etc. An enterprise might be a commercial company, corporation, or conglomerate. An institution might be a public institution, government bureaucracy, a university, a college, or a research facility. Entities may have different administrative arrangements (including inventory software management) within the enterprise/institution, and may possess different administrative policies or procedures that present a barrier of one entity discovering items that are excess, spare, legacy parts, unused, defective, and/or components of these parts or items possessed or controlled or managed by a separate entity.

The internal private online marketplace may possess a communications network that may allow one subsidiary to communicate, via a network, with at least one other subsidiary, and/or the enterprise/institution. One or more databases containing information of interest to the subsidiary may also be available via a network. Such information may include data about individual items that are possessed by, e.g., one (first) subsidiary, but may be desired by another (second) subsidiary. The discovery of these individual items may be facilitated by a query or search of at least one database by the second subsidiary using the communications network.

As will be explained in greater detail below, embodiments of the instant disclosure may facilitate the identification of desired items within a database that contains information of items that are spare, legacy, unused, discarded, defective as well as components contained within such items. In some cases, the desired items may be constituents, parts, subsystems, etc. of a system and thus may be more useful to agent or an entity than the system/subsystem itself. A system/subsystem may include many constituents, one of which, an item, is desired by an agent representing a destination subsidiary. An example might be of a GPU or CPU available on a defunct, unused, or a legacy motherboard or assembly. Another item may be the interface board in a printer. The printer itself may be useless, but the interface board may be of benefit. Another example may be a PCI board that might contain proprietary integrated circuits. Such a component may be extracted from a motherboard which may be defunct for a reason other than the desired component, and used as a replacement component either in a similar motherboard, or elsewhere. Other possible items associated with a system/subsystem might be hoses, vacuum components, cables, connectors, compressors, power supplies, software routines or packages, firmware, controllers, IC chips, flash drives with propriety firmware/software, or, e.g., mechanical assemblies. The components of a mechanical assembly may consist of special or proprietary gears, planetary gears, shafts, vibrational dampening elements, housings, motors, controllers, or pistons. Any of these components may be a constituent of a larger mechanical assembly, and this larger mechanical assembly may be the item which is listed as available in a database, and not the individual components themselves. It is likely that an agent placing an entry for a multi-component system/subsystem into the internal private online marketplace would enter the information for that system/subsystem itself, and not information associated with any individual components of which it constitutes.

Examples may be: a component or sub-assembly which is more valuable than the device (system/subsystem) in which it is contained; parts within an upgrade or service kit; calibrated standards provided with precision measurement equipment; graphics card in a computing device; memory modules of a computing device or other device that uses physical memory; vacuum tubes, for example in an older stereo system; transformers; motherboards in a computing device; interface panels or boards from network equipment, e.g. a device with several disparate input/output ports; battery packs; motors, rotors, gears, axles, shafts, pistons, special O-rings, commutators, magnets, antennae, amplifiers inside speakers; pressure or vacuum equipment; computer peripherals, or jet engines, or parts thereof, and other associated equipment.

Items may be tangible, such as hardware, or intangible, such as software. The contents of a database may contain a variety of specific information concerning an item, such as its OEM markings, the end-user markings, and/or a list of components contained therein.

Additionally, digital images of the items may be obtained, provided, or received, and with the use of segmentation algorithms processing the digital images and trained neural networks such as convolutional neural networks, or semantic convolutional neural networks, the items or components of the items may be automatically identified and cataloged into one or more databases. Equivalent components with different markings may be combined with a common identification/designation, and such data stored in a database for subsequent retrieval in the identifying process.

Reference will now be made to various exemplary embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

The following will provide, with reference to FIGS. 1-5, detailed descriptions and examples of systems, computer-implemented methods, and media containing computer-implemented instructions of an internal private online marketplace to facilitate the identification of items located in one or more databases, and to facilitate the negotiating of a transfer protocol between separate entities of an enterprise/institution.

FIG. 1 is a flow diagram of an exemplary computer-implemented method 100 for identifying (step 110) items (e.g., legacy, spare, defunct, unused, software, etc.) by a destination entity querying one or more databases (see, e.g., System 200 of FIG. 2) associated with one or more computing devices (e.g., 202 and/or 206 of FIG. 2), a peer-to-peer computing arrangement (e.g., 202 and 206), or client-server computing devices (e.g., 202/206). Upon identifying the desired items, a transfer protocol may be generated (step 120) based on one or more pre-conditions set by at least one of the enterprise/institution, the first (source) subsidiary/entity, or the second (destination) subsidiary/entity.

Figure 2:
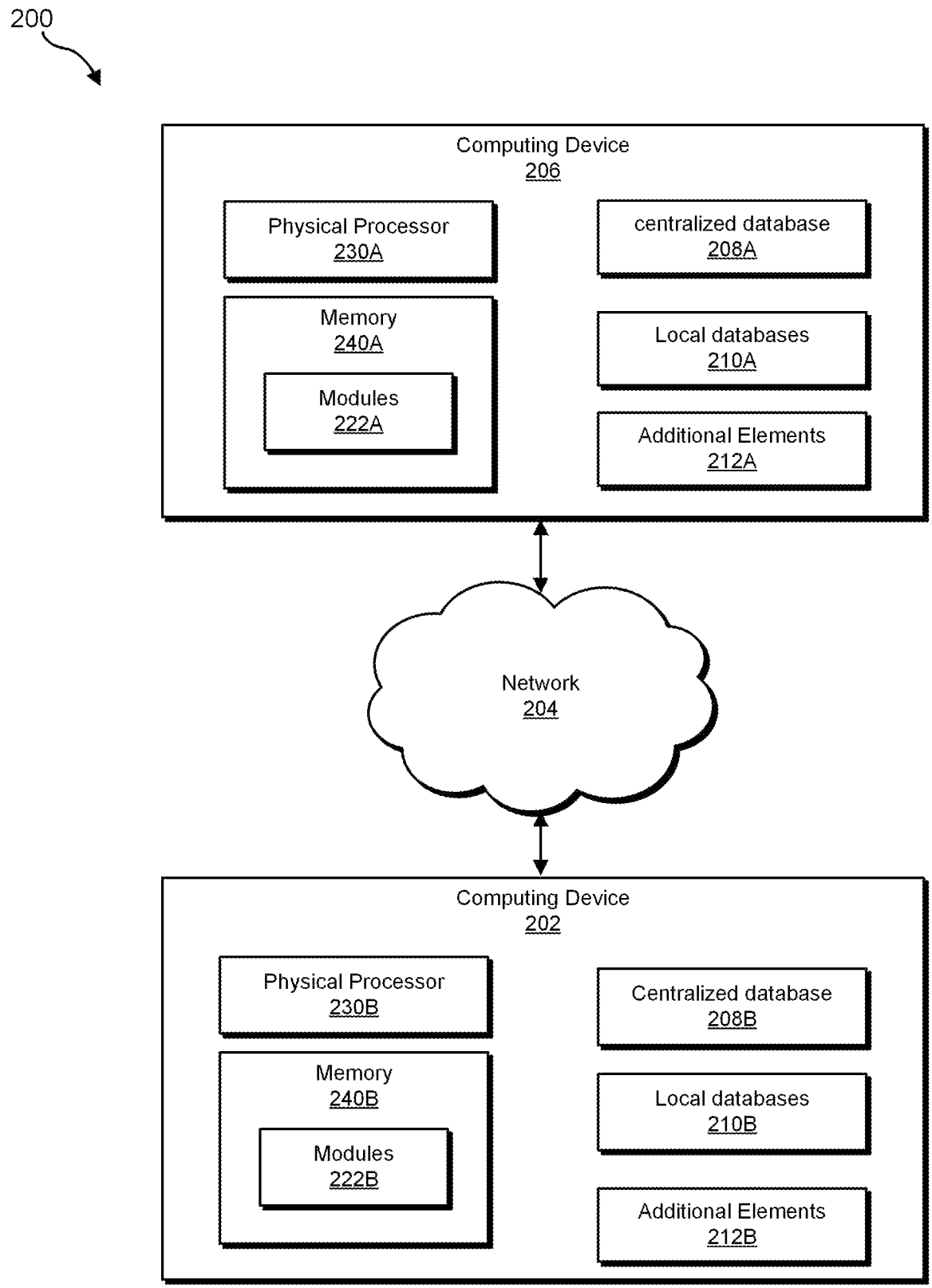
FIG. 2 is a block diagram of an example system or architecture in accordance with some of the embodiments described in the present application.
Figure 3:
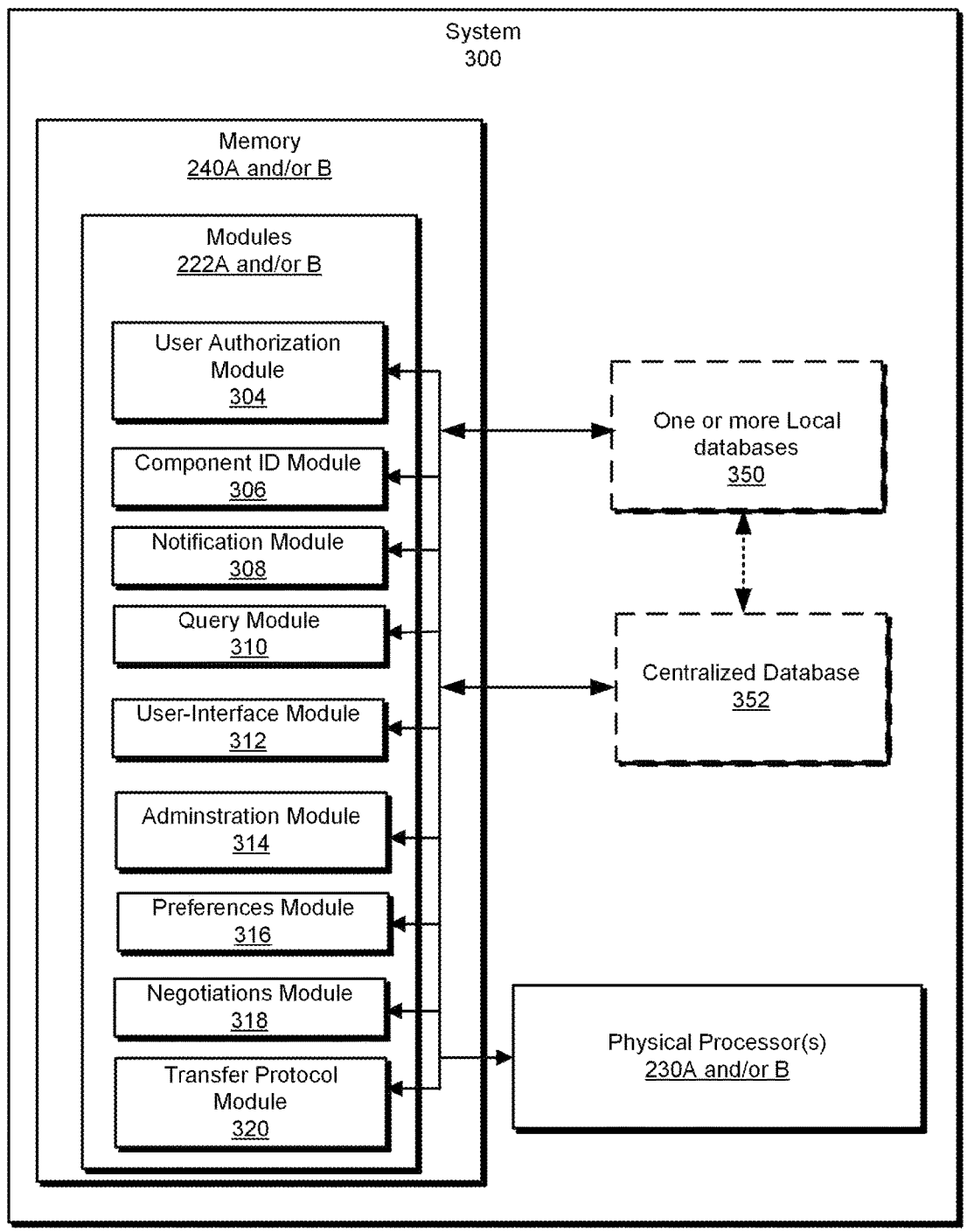
FIG. 3 is a block diagram of an example system or architecture in accordance with some of the embodiments described in the present application.
Figure 4:
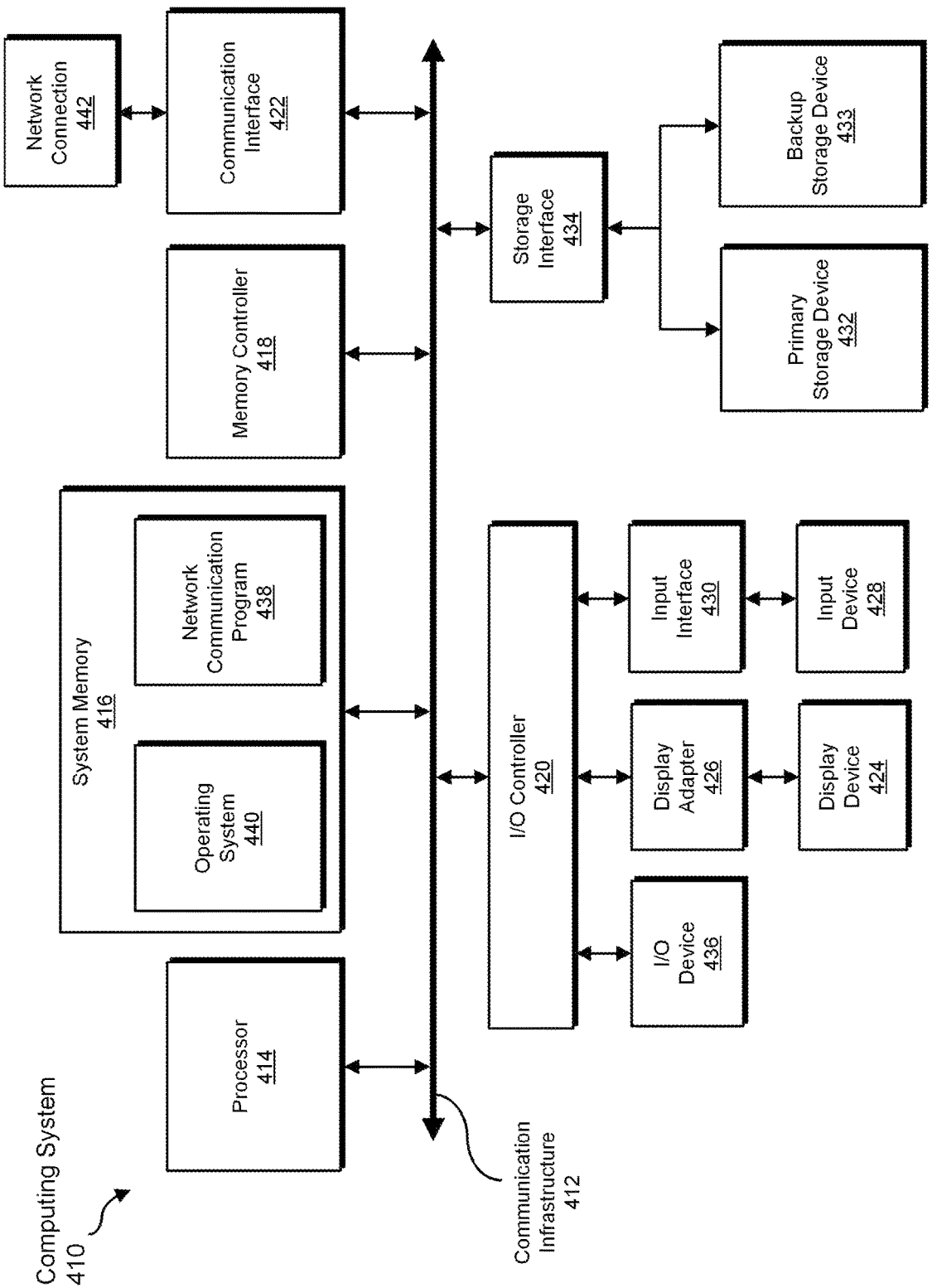
FIG. 4 is a block diagram of an example computing system capable of implementing one or more of the embodiments described and/or illustrated herein.

Each of the steps shown in FIG. 1 may be performed by any suitable computer-executable code and/or computing system, including one or more components of system 200 in FIG. 2, system 300 in FIG. 3, or system 400 in FIG. 4, and/or variations and/or combinations of one or more of these systems. In FIG. 2, an exemplary embodiment is presented in which computing device 206 may be represented by a server computing device and computing device 202 may be represented by a client computing device. These systems may be interconnected via an exemplary network system such as that shown in FIG. 5. The exemplary network system 500 may be an example of the network 204 depicted in FIG. 2. In one example, each of the steps shown in FIG. 1 may represent an algorithm whose structure includes and/or is represented by multiple sub-steps, examples of which will be provided in greater detail below.

In FIG. 1, at step 110, a query of a database (e.g., 208A/B or 210A/B) may be performed by a destination entity representing a destination entity of the enterprise/institution using the algorithm of the query module 310 which may yield identification of one or more items that a source entity of the enterprise/institution may possess or at least may control the disposition thereof of said one or more items. The database may be a logical set of local databases, each local database found at a different physical location, or may be just logical partitions of a central database, or may be a physical database. Query module 310 may have also the ability to produce or access a thesaurus (a list of synonyms) for any particular keyword used in the query action. Additionally, the query module 310 may also have the ability to automatically translate a stored characteristic into another language, which may depend on the options set in the preferences module 316.

Such an approach greatly facilitates or makes advantageous the discovery of items wanted or needed by an entity within the enterprise/institution.

After identification of these items, at a subsequent step 120 of FIG. 1, the destination entity may then proceed to establish with the source entity/agent the requirements for a transfer protocol which may detail, for example, transferring ownership or re-locating the one or more items from control of the source agent to that of the destination entity. A re-location may entail the physical transfer of the items from a source location to a destination location. The transfer protocol may also entail placing the items into an external marketplace to allow consideration by a much larger destination, buyer, or environment.

Step 120 of FIG. 1 may be performed by a module of system 200 of FIG. 2 or of system 300 of FIG. 3. This step may generate a transfer protocol which may facilitate and/or describe the nature of the transfer, e.g., physical, between two agents/entities/subsidiaries. A module that may perform one or more steps or sub-steps associated with step 120 of FIG. 1 may be that of the transfer protocol module 320.

The transfer protocol module 320, stored in memory, may retrieve, perhaps from a database, one or more pre-conditions set by one or more of the following: enterprise/institution, a first entity, a second entity, a first subsidiary, a second subsidiary, a destination subsidiary, or a source subsidiary. These pre-conditions may include or explain a protocol that may be relevant for the transfer of the items between the destination and the source entities. The pre-conditions may be unique to a given type, category, or condition of item. These pre-conditions may define the procedures as to any charges that are to be made, how the burden of transfer may be divided amoungst the entities involved, how the physical transfer is to occur, or which entity is encumbered with the bureaucratic/administrative aspects associated with the transfer. Costs associated with relocation transfer or shipping may be calculable based on the dimensions, weight, and handling aspects (e.g., delicate or hazardous). These characteristics may be known in advance, and may be available from a database. The transport protocol module 320 may also note the costs for the relocation of the item(s) between the parties involved, e.g., subsidiaries. The mechanism for the physical relocation of the item(s) may be one of the pre-conditions of, e.g., either subsidiary, or the enterprise/institution. It may be possible that all the information required to calculate a reasonably accurate relocation charge exists at the time that the item has been located by a search performed by the searching entity (e.g., the second subsidiary). This information may be one of the guidelines or pre-conditions contained within the transfer protocol. Alternatively, or additionally, the transfer protocol may include a listing of the item(s) to be transferred.

One of the possible actions that may result from the determination of the transfer protocol is a shipping label from the source subsidiary to the entity (or destination address). The distance between source and destination may be known in advance, as would be the probable routing scheme of one or more delivery services, as would be their charges. It may be possible that an in-house delivery service between subsidiaries exists, and the transfer protocol may specify this mode of transfer instead of a commercial delivery service. Another example of a pre-condition may be that the source entity limits the number of items to be transferred or to be provided to the destination entity.

An exemplary format for the transfer protocol produced by the transfer protocol module 320 may include a listing of actions to be executed or conditions to be satisfied, generated, or accomplished by one or more of the parties involved, e.g., source subsidiary, destination subsidiary, and/or the enterprise/institution. The actions or conditions listed in the transfer protocol may been pre-filtered, ordered, or ranked according to the pre-conditions set before the commencement for the search for one or more desired items by the destination subsidiary.

Another example of a pre-condition may be that the associated costs/charges may be distributed, perhaps equally or non-equally, between the players involved: enterprise/institution, destination entity, and/or source entity. Pre-conditions from each of the participating entities and/or from their enterprise/institution may be stored in a database or at least in a form that is accessible by the transfer protocol module 320. Additionally, one or more pre-conditions set by one entity may be overridden by pre-conditions of the other entity, or by those pre-conditions of the enterprise/institution. Such an arrangement may overcome any potential conflicts that may arise.

Alternatively, or additionally, the transfer protocol may include budgetary information, in which the responsibility for the items is transferred to an entity which may, for example, be sold to another enterprise/institution or go into receivership, and the arrangement for physical transfer is addressed separately.

In an alternative example, a subsequent step after the identifying of the desired items, is to provide the mechanism for the parties involved, such as the first and the second subsidiaries, to propose and counter-propose aspects of the transfer protocol. This may be an iterative process. If a pre-determined maximum number of iterations has been reached, one or more pre-conditions of the enterprise/institution may be applicable to resolve the final transfer protocol. Such a resolution may, for example, include that a corresponding pair of propose/counter-propose may be averaged to achieve a finalized transfer protocol. An alternative solution, may be that, e.g., an economic criterion, such as the subsidiary with the higher profit margin, absorbs the costs implied by the transfer protocol. The maximum of number of iterations involved with the negotiations may be one of several pre-conditions established by the enterprise/institution prior to any negotiation processes, or by prior arrangements between the involved parties, such as the first (or source) subsidiary, the second (or destination) subsidiary, and/or the enterprise/institution. Alternatively, the enterprise/institution may set limitations on any and all pre-conditions, perhaps in order to normalize transactional behaviour, in order to minimize potential conflicts.

The transfer protocol may not be a binding legal document as in a contractual sense, and may be only valid within the confines of the enterprise/institution. Subsidiaries of the enterprise/institution may be therefore, by definition, trusted, and no vetting may be required. In some examples, the transfer protocol is advisory in nature. The transfer protocol sets out actions to be taken to accomplish or to facilitate an exchange of the item between parties. Thus, no legal actions may be taken by either party involved, e.g., a first subsidiary or a second subsidiary, to enforce the actions, policies, or arrangements that may be within the protocol. However, within the confines of the enterprise/institution, bureaucratic influence may be present to affect the transfer of an item between parties based on the actions outlined therein. If the transfer of the item may be to an entity outside the confines or bureaucratic sphere of influence of the enterprise/institution again it will be a statement of actions to be completed, at least by the first or source entity to affect a transfer to the external entity. Such a protocol may more resemble diplomatic protocol, in the sense of actions or behaviour expected to be taken, but no legal requirement to do so. In some examples, a transfer protocol may just state that the item or items have been donated to an entity, either internal or external. The external entity may be a non-profit entity. In the situation of an internal entity donating, this may be an intentional act to reduce storage and/or maintenance costs for items no longer needed.

A subsequent step 130, shown in the flow diagram of FIG. 1, is to communicate, provide, or distribute to the various involved parties the transfer protocol established or generated at step 120 of FIG. 1. Such a communication may be accomplished by a transfer via network, or perhaps a printed version is automatically generated and forwarded to the involved parties by more conventional means. Such a communication may be facilitated by the notification module 308 shown in FIG. 3. The communication may include actions to be taken by each side to finalize the transfer of the desired item(s). Other information that may be part of the transfer protocol may include addresses, contacts, shipping methodology, timescales for delivery, insurance arrangements, valuations, etc. Alternative to, or additionally with communicating actions to be taken, the actions indicated in the transfer protocol may be performed or executed. Alternative or additional forms of communications by the notification module include email, SMS, voice, system notifications, and/or browser responses.

FIG. 2 presents an example of a computer-based system capable of performing one or more tasks as outlined in the present disclosure. In certain embodiments, one or more of modules 222A and/or of modules 222B in FIG. 2 may represent one or more software applications or programs that, when executed by one or more computing devices, may cause the one or more computing devices to perform one or more tasks as described herein. For example, one or more of modules may represent modules stored and configured to run on one or more computing devices, such as the devices illustrated in FIGS. 2-4 (e.g., computing device 202 and/or computing device 206) in FIG. 2. One or more of modules 222(A and/or B) in FIG. 2 may also represent all or portions of one or more special-purpose computers configured to perform one or more tasks.

As illustrated in FIG. 2, example system 200 may also include one or more memory devices, such as memory 240(A and/or B), which may generally represent any type or form of volatile or non-volatile storage device or medium capable of storing data and/or computer-readable instructions. In one example, memory 240(A and/or B) may store, load, and/or maintain one or more of modules 222(A and/or B). Examples of memory 240(A and/or B) include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example system 200 may also include one or more physical processors, such as physical processor 230(A and/or B). Physical processor 230(A and/or B) generally represents any type or form of hardware-implemented processing unit capable of interpreting and/or executing computer-readable instructions. In one example, physical processor 230(A and/or B) may access and/or modify one or more of modules 222(A and/or B) stored in memory 240(A and/or B). Additionally, or alternatively, physical processor(s) 230(A and/or B) may execute one or more of modules 222(A and/or B) for notifying a client computing device of unreceived notifications on a server computing device. Examples of physical processor 230(A and/or B) include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As depicted in FIG. 2, computing device 202 and/or computing device 206 may have access to one or more databases, such as 208A/B and/or 210A/B of FIG. 2. The databases 210(A and/or B) may be local to the location of the entity or local in the sense of resident on at least one of the computing devices 202 and/or 206. The local databases 210(A and/or B) may be logical subsets of a physical centralized database 208(A and/or B). Alternatively, a central database 208(A and/or B) may be the logical combination of one or more of physical local databases. The databases 208B and/or 210B associated with computing device 202 may be the same or separate, either physically or logically, from those associated with the computing device 206, e.g., databases 208A and/or 210A. The network 204 may connect several physically separated databases into a logical centralized database such as either 208 (A and/or B).

As illustrated in FIG. 2, example system 200 may also include one or more additional elements 212(A and/or B), such one or more systems or components that may be computing devices (e.g., computing device 202 and/or computing device 206 as shown in FIG. 2).

Example system 200 in FIG. 2 may be implemented in a variety of ways. For example, all or a portion of example system 200 may represent portions of example system 300 in FIG. 3. As shown in FIG. 2, system 200 may include a computing device 202 in communication with a computing device 206 via a network 204. In one example, all or a portion of the functionality of modules 222(A and/or B) may be performed by computing device 206 and/or computing device 202, respectively, or any other suitable computing system or arrangement of separate computing systems. Thus, the term "system," in some embodiments, may refer to a single computing device, a peer-to-peer arrangement, multiple computing devices, including a client/server architecture, and/or virtual computing devices.

As will be described in greater detail below, one or more of modules 222(A and/or B) of FIG. 2 may, when respectively executed by at least one processor of computing device 202 and/or computing device 206, enable computing device 202 and/or computing device 206 to facilitate the identification of items located at a source entity in which a destination entity desires to have. For example, as will be described in greater detail below, one or more of modules 222(A and/or B) may cause computing device 202 and/or computing device 206 to perform steps of an exemplary method 100 shown in FIG. 1. Each step depicted in FIG. 1 may include additional sub-steps.

In some embodiments, computing device 206 may include modules 222A such as a notification module 308 of FIG. 3 and as well as other modules as appropriate. Notification module 308 may be stored on computing device 206 or may be stored at a location that is external to computing device 206, e.g., computing device 202. In some embodiments, a database 208A and/or 210A residing on, for example, computing device 206 may receive and store data associated with notification module 308 and/or additional data, filter data, and/or authentication data. Similarly, any of the modules of the systems depicted in either FIG. 2 or FIG. 3 may be stored external to computing device 206, such as computing device 202.

Computing device 202 generally represents any type or form of computing device capable of reading computer-executable instructions and/or capable of executing one or more of modules 222B in FIG. 2 or 3. In at least one embodiment, computing device 202, which may request information or data from at least one other computer, such as a server computing device, may be a client computing device. Additional examples of computing device 202 include, without limitation, laptops, tablets, desktops, server computing devices, cellular phones, Personal Digital Assistants (PDAs), client/client, multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Computing device 206 generally represents any type or form of computing device that is capable of executing one or more of modules 222A of FIG. 2. Additional examples of computing device 206 include, without limitation, servers, security servers, application servers, web servers, storage servers, and/or database servers configured to run certain software applications and/or provide various security, web, storage, and/or database services. Although illustrated as a single entity in FIG. 2, computing device 206 may include and/or represent a plurality of servers, or in some embodiments, computing devices that may work in parallel, or may work and/or operate in conjunction with one another.

Network 204 generally represents any medium or architecture capable of facilitating communication or data transfer. In one example, network 204 may facilitate communication between computing device 202 and computing device 206. In this example, network 204 may facilitate communication or data transfer using wireless and/or wired connections. Examples of network 204 include, without limitation, Ethernet, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

In some examples, all or a portion of example system 200 in FIG. 2 may represent portions of a computing environment, including a mobile computing environment. Computing environments may be implemented by a wide range of computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behaviour of other applications, controls to restrict the installation of applications (e.g., to originate only from approved application stores), etc. Various functions described herein may be provided for a mobile computing environment and/or may interact with a mobile computing environment.

In addition, all, or a portion, of example system 200 in FIG. 2 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, databases, backup systems, archival systems, replication systems, high availability systems, data search systems, virtualization systems, and the like.

In some embodiments, all or a portion of example system 200 in FIG. 2 may represent portions of, produce data protected by, and/or communicate with one or more systems for information security. As used herein, the term "information security" may refer to the control or restriction of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 200 in FIG. 2 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user-authentication systems, encryption systems, privacy systems, spam-filtering services, and the like.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules of a client computing device, as recited herein, may receive data from a server computing device. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The query module 310 of FIG. 3 may allow a user to search for items either in a specific local database, e.g., 350, in a plurality of local databases 350, or in the central database 352. One of or more of these aforementioned databases may be those of the computing devices 202 and/or 206 as depicted in the system 200 of FIG. 2 (e.g., 208A/B, or 210A/B) or databases 350 or 352 of FIG. 3). Search criteria entered may be entered using the user-interface module 312 which may involve a graphical-user interface. The query may be performed by the query module 310 and may identify, either exactly, or approximately one or more items, components, systems, subsystems in the form of hardware and/or software based on the entered criteria. Wildcards may be used in the creation of the search keywords or information. Alternatively, or additionally, the user-interface module 312 may have components of a non-graphical nature which may allow communication with the system of which the user-interface module resides and is execute, such as a keyboard, or accepting audio or perhaps voice commands.

Search criteria (e.g., characteristics) may also include an identity number or identity markings, an operational range (e.g., range, minimum, maximum of, e.g., voltages, currents, bandwidths etc.), if applicable, identification(s) of components of items—either loosely defined or with more specificity, wattages, sizes, function, inputs, outputs, condition metrics of items and/or their components, various descriptions, quantities of items and/or components of items, locations of items, any pricing information that the offering agent may provide, approximate transfer costs between source and destination entities. Additional or alternative search criteria may be performed using images of the desired item. For example, an agent representing a destination entity may take an image of the item or items which this agent seeks. The image may be uploaded to, e.g., a module of a system, such as the system exemplified in FIGS. 2 and/or 3.

An appropriate module may be the component identification (ID) module 306 of the system presented in FIG. 3. The module 306 may process the item's image into a format more appropriate for further processing, e.g., in a comparison of the image of the desired item with that of pre-stored images of items present in a database. These stored images of items available in the internal private online marketplace may have been pre-processed to place them into a standard format to facilitate, e.g., a more direct comparison with any image of the desired item. Perhaps additionally, the stored library images may have specific associated keywords, which may be used additionally as the aforementioned search criteria.

More conveniently, a mathematical procedure, such as may be accomplished by cross-correlating the desired item's image with one or more images of a database of stored images of those items already present in a database, may be utilized. The cross-correlating procedure may additionally include exemplary image transformation pre-processes or processes such as scaling, specific filtering with one or more kernels, rotations, histogram normalization, binarization, thresholding, and/or edge enhancement/detection. A subset of these processes may place an image into a standard format. A value for each correlation performed between a desired item's image and a library image may be the result. From the set of correlation values thus obtained, one or more stored library images may yield a high enough correlation value e.g., a most probable or more probable value (e.g., >0.5), to warrant a likely hit. This may aid in identifying the desired item existing in the internal private online marketplace. Additionally, one or more search keywords may also be used to narrow the set of stored library images, prior to any image comparison technique. Alternatively, or additionally, a visual comparison of the relevant images may be subsequently presented to the agent or user.

As discussed hereinabove, search criteria for an item may be entered by an agent or user. Alternatively, images of the item may be received which may be processed by the component identification (ID) module 306 of FIG. 3 also discussed hereinabove. The module 306 may be stored in memory 240 (A and/or B) of at least one of the computing devices 202 or 206 of FIG. 2. The images may then be processed by the component identification module 306 to identify one or more characteristics and/or identity markings and/or constituent components which may then be automatically stored or entered into a database, such as e.g., 208 (A/B) or 210 (A/B) for future retrieval by, for example, an agent or user which may seek to identify items, components, systems, or subsystems. Such items may consist of hardware or software or both.

The identification methodology may use at least one of a convolutional neural network, a character recognition algorithm (e.g., OCR), a support vector machine, or a segmentation algorithm. These are exemplary procedures the net result of which may be accomplished by alternative methodologies. These procedures may process one or more item images to identify one or more identity markings, and/or constituents of the one or more items. The neural network may be trained on training data in advance to recognize characters or structures isolated either by the convolutional neural network processes, or by segmentation and isolation of the constituents. The operation of segmentation may be the partitioning of an image into non-overlapping component regions which have some common element or nature such as intensity or texture. Segmentation may partially involve the use of an edge detector, such as, e.g., the Canny edge detector. In some interpretations, segmentation may first involve determining approximately an object's location in a region of the image. A subsequent step may be to determining the object's precise location, spatial extent, composition, and gradation of intensities.

Character recognition may form a separate neural network operation from the detection of hardware, such as integrated circuits found within regions. Computed sizes and any identity markings may be retained in, e.g., one or more databases accessible by the systems depicted in either FIG. 2 or FIG. 3. A given item may be identified by several distinct identity markings, depending on when and where the item was manufactured. These distinct identity markings for a given item may be retained in a database. Alternatively, a search in a database for function and any applicable other characteristics may reveal the availability of the item.

In some examples, segmentation may proceed by first applying a kernel over an image to pre-process it in order to reduce the noise within the image. Such a smoothing kernel may be a symmetric matrix defined by a function such as, e.g., a Gaussian, or a modification thereof. A subsequent step may be to apply an asymmetric kernel to the image. A type of asymmetric filter may be that of, e.g., a Gaussian derivative. The image data (pixel intensities) may then be subjected to threshold and binarized in order to separate low-frequency areas (non-edges) from sharp changes in intensities (i.e., edges). The resultant image may then be subjected to an edge detection operator such as, e.g., that of a Sobel (or Prewitt, Roberts cross, etc., or other operators as appropriate for the task). These operators yield a value for the first derivative. Such operations are performed normally along the various axes (columns or rows) of the image, and may even be processed along oblique or diagonal lines of pixels in the image. The edges or collection of edges may then be fitted with functional forms or convoluted with stored data to derive identity markings. The afore-described is not limited to Gaussian functions. Other functional approaches, e.g., Hough transform, may also be appropriate according to what is to be discovered in the image.

There are a multitude of algorithms to deal with the segmentation problem (see, e.g., DuBuc 2011 and the citations contained therein). Many of these algorithmic approaches deal with either the intensity data or a gradient image and usually assume some basic shape or characteristic. Early attempts used a one-dimensional convolution kernel. More exotic approaches involve optimal graph search methods, Markov random fields, pliable geometric models, graph partitioning, support vector machine (SVM), model-based guidance, random forest, neural networks, clustering algorithms (e.g., k-clustering, or k-means clustering), etc. A common approach has been edge-based detection, and in many cases using a version of the Canny edge-detection methodology (Canny 1986). Others have used region-based constraints, which look for similar intensities within a region. Most of these algorithms require considerable computational resources.

Prior to analyses of images by segmentation algorithms, the images are usually pre-processed to improve the sensitivity of the detection algorithm used (e.g., edge or region) to the morphological characteristics of the region of interest. Most of these involve smoothing by various kernels or averaging and speckle noise reduction processing. Typical pre-processing steps could include median filtering, mean filtering, non-linear anisotropic filtering, combinations thereof, Low/High Pass filtering wavelets and, fixed-pattern noise removal. These processing techniques and others would be readily recognized by the ordinary skilled person the art as reducing the contribution of noise to the signal.

Determining information such as identity markings (letters, numbers, symbols) from images may be performed in several steps. A first step may be to process an image of a system/subsystem to reduce noise. Additionally, this step may be accomplished by a kernel which may aid in reducing noise, but also may be so designed to enhance the detectability of identity markings. A subsequent step for pixel classification (e.g., background or identity marking) may be the use of thresholding, 2D-correlation techniques, or classifier techniques. The use of thresholding creates a partitioning of the image pixels based on quantifiable features like image intensity or gradients.

An alternative processing step may be to process the image with an asymmetric function along each row and/or column, or alternatively, with a 2D version thereof. Such a function may enhance sharp features while reducing the intensity of more relatively uniform regions. In some examples, this may be an edge-based process which locates the edges of objects in the image, while reducing the effects of noise. Thresholds in such a method are thus related to edge behaviour. An alternative may be the use of discerning regions—exploiting the fact that pixels inside a given structure tend to have similar intensities or a narrower intensity histogram.

In a separate step, an image may be binarized by setting a threshold in which all pixels above the threshold value are set to a given value (upper), and all pixels below that threshold value are set to another, lower value. Oftentimes, the larger value is one, and the lower value is zero. In one example, histograms may be used in the thresholding process to set the upper and lower values in the binarization.

In the case of the detection of edges of identity markings or of physical components of the system/subsystem, the edges may be fit with a function, such as a line, curve, or a set of connected lines. An enclosed curve of pixels of similar intensities may be identified as a component or item within the image, and thus its size or dimension(s) may be determined.

In the case of lettering or numbering, a region may be extracted about a particular detection and that image cross-correlated with a set of template images each containing a single and known letter or number. The region in question may be assigned to the letter or number which has a higher correlation or most probable value (e.g., >0.5). Alternatively, marginal distributions may be obtained for a sub-image of the region in at least two preferably orthogonal directions. These values may then be compared with a database of similar determinations for templates of letters and numbers. The distributions, being one dimensional, may be reduced to one or more single values of various distribution moments, or the distributions themselves may be cross-correlated with the template versions to identify characters. An additional marginal distribution that is not parallel to any other marginal distribution by a non-quadrant rotation. This 'oblique' marginal distribution may then be used as an additional clarification criterion should any ambiguities in the assignment of a letter or number to a region occur. Values may be assigned to each marginal distribution, such as a mean, median, mode, as well as intensity moments, e.g., first, second, third, etc. intensity moments. These values may form a feature vector which identifies the contents of the region uniquely. A neural network may be trained using such values from the template images. This neural network would take an unknown set of values and locate the most likely identity marking.

In one example, feature vectors of known characters or of known items may be assembled which may then be used to establish a support vector machine. The components of a feature vector may be derived, in part, as in the aforementioned, with the use of marginal distributions or using a plurality of single value representations thereof. Additional, or alternative components of the feature vectors may be derived from size or dimensional information, or other information available attributable to an item. The ensemble, or a part thereof, of the feature vectors of known characters or items may then form a support vector machine (SVM). The formation of a feature vector of an unidentified or desired item found in an image may be formed in a similar way as the feature vectors of known items. Processing this feature vector of the unidentified or desired item through the SVM may allow identification or recognition of the unknown or desired item.

In another example, semantic segmentation may be used to process images of an item. In semantic segmentation, a prediction for the objects present in an image may be specifically identified. This is achieved by labelling each pixel of the image with a category of object. Such objects may be IC chips, identity markings, lettering, logod, processors, GPUs, CPUs, Pas and other peripheral boards, DVDs, CDs, cabling, hard discs, valves, switches, heat sinks, connectors, or of any item, component, system/subsystem that may be found at a subsidiary or entity of an enterprise/institution.

The arrangement for semantic segmentation process or module may include an encoder, which is a pre-trained classification network followed by a decoder. The task of the latter may be to semantically label low-resolution features discovered by the encoder onto the appropriate pixels of the image. A convolutional neural network may be one form of semantic segmentation, possessing modules to extract regions of objects, compute features for the CNN, and then to classify regions. The convolutional neural network may be of the encoder-decoder framework mentioned hereinabove.

In either or both of the systems outlined in FIG. 2 or FIG. 3, notifications to/from various interested parties may be required. In some examples, a notification may be sent by the notification module 308 shown in FIG. 3 based, at least in part, on the results obtained in step 110 of FIG. 1 of the identifications of one or more items found in one or more databases accessible by one or more agents and/or users. Notification module 308 may communicate with computing device 202, at least in part, the results of a query performed by the destination entity by the user of the query module 310. The results may include a set of specifics of the one or more items so identified by the query. Such specifics may include one or more costs associated with a given quantity of items (cost metrics), locations one or more sources of the items and/or one or more condition metrics of the items.

The notification module 308 may provide to the destination entity information concerning the availability of items found from a query search performed. Alternatively, or additionally, the destination entity may have searched for an item using the query module 310, and this item which may not have been available at the time of an initial query. Alternatively, or additionally, the notification module 308 may notify the source agent of the results obtained by the destination entity using the query module 310. Additionally, or alternatively, the notification module 308 may have the capability of communicating the transfer protocol, generated by the transfer protocol module 320, to the various or appropriate parties involved.

Should the information concerning the desired items appear in one or more databases subsequent to the initial query, then the notification module 308 may forward to the destination entity information regarding the availability of the desired items, as well as specifics involving costs, condition, etc. The results of the notification module 308 formats desired information based upon agent/user preferences that may have been set by at least one of the user-interface module 312 or preferences module 316 as depicted in FIG. 3. The desired information may include a cost metric and may additionally include at least one condition metric of each of the items. Cost metrics may also include one or more of the following: transportation costs, administrative costs, and/or costs for extracting components contained within the items. A cost of an item may not be the valuation assigned say, for example, by some external public marketplace participant, as profit may not be the vector in the internal private online marketplace. Administrative costs may include those such as manpower costs associated with the transfer of the desired items: packing and shipping of the desired items and any other fees associated with direct participation of personnel of the disposing (source) entity.

Condition metrics may include a level of operability, in which the level of operability or operability may include one of non-operable, partially operable, or fully operable. Additionally, or alternatively, condition metrics may also include an item or a system/subsystem being legacy, spare, defective, unused, refurbished, reconditioned, outmoded, or defunct.

A user-authorization module 304 of FIG. 3 may be one of the modules 222 (A and/or B) resident in memory 240 (A and/or B) that is part of systems 200 and/or 300 depicted respectively in FIGS. 2 and 3. The user-authorization module 304 may provide access to the databases and/or module tasks to certain users who may be officially authorized to perform one or more actions of the systems and/or methods described herein. Such actions may be to enter into a local database information, such as one or more characteristics/identity markings, concerning one or more items that are available in a source location controlled by a source entity of the enterprise/institution for transfer to a destination location controlled or managed by a destination entity of the enterprise/institution, or to access a one or more local databases 350, or a centralized database 352, or to instigate negotiations (step 120 of FIG. 1) with respect to items that may have been found in a query of any one of the various databases (step 110 of FIG. 1).

Data or information may be entered into a local database 350 may be performed by one or more agents representing entities. These data of the local database 350 may be transferred into the centralized database 352 by an authorized user and/or may be accessed by users given sufficient authorization by, e.g., the user-authorization module 304 and/or the administration module 314.

User authorization may include read-only access, write-only access, or read/write access. Moreover, user-authorization module 304 may also allow access to only subsets of the information of items available in either the local database or the central database or to specific dictionaries applicable to a given technology. The term local may also be a logical part of the central database, not necessarily physically separated therefrom. Alternatively, the centralized database may be one that is created by a logical or virtual collection of separate physical local databases into what may appear to a user to be a single database.

A user-interface module 312 may be available to provide the possible interactions of a user/agent with the various functions of the system 200 and/or 300. Input and outputs, various search criteria, wildcards, etc. may be available to assist a user in discovering if a local or a centralized database contains information items regarding perhaps of interest. Outputs to the user-interface module 312 may be prepared or formatted by the notification module 308. The results of a query may be displayed using the user-interface module 312, or may aid in facilitating the presentation of results or information on an alternative medium. The user-interface module 312 may include a screen-based system such as a graphical user-interface.

An additional module that may be present in systems 200 and/or 300 is that of the negotiations module 318. It may facilitate an iterative process of negotiations between entities (source and destination) or their respective agents (source and destination), should such a process be desired, of providing an environment in which proposals, bids, suggestions, offers may be placed by a source or destination entity, and allowing the other side to respond. Unlike normal commercially available online marketplaces, maximizing benefits to one agent, or minimizing costs to the other agent may not be the rationale that may drive negotiations as enterprise/institution policy, in the form of pre-conditions, may override such extrema. The negotiations module 318 of FIG. 3 may facilitate step 120 of FIG. 1, in that a transfer protocol for the one or more items may be negotiated between a destination entity and a source agent. Subsequent actions indicated in the transfer protocol may be performed, carried out, or executed by the relevant players involved.

The negotiations module 318 may permit the destination entity to instigate or present an initial transfer protocol on the one or more items that may have been discovered using the query module 310. Whereupon, that initial transfer protocol may then be conveyed to the source agent. This conveyance may be performed by the notification module 308. Due to preferences by the source agent or the source entity that may have been set by the preferences module 316, the total quantity of items desired by the destination entity may not be known or presented to the destination entity. Thus, an iterative process, managed or performed by the negotiations module 318, may ensue until at least one of the agents involved, source and destination, is satisfied, or until a level of convergence has been reached, or even terminated if the number of iterations has exceed a predetermined value. The number of items, the condition of the items, the transportation or transfer costs, any administrative costs may be included in the negotiated transfer protocol between the destination and source agents. Each of these costs or cost metrics may be collectively or separately managed by the negotiations module 318. The negotiations module 318 may be part of the iterative process, or may just state one or more cost metrics of one or more items that an agent must offer or accept. This module may truncate negotiations if it senses that subsequent iterations are not converging (i.e., convergence rate is below a certain threshold) to an overall acceptable transfer protocol. An acceptable transfer protocol may be one that is deemed by the enterprise/institution to be fair for both entities (source and destination), or one that is fair to the enterprise/institution exclusively. Rules of engagement between a purchasing entity or agent and a receiving entity or agent may be established by the enterprise/institution into the negotiations module 318. A cost metric may be a cost associated with different quantities of interest, e.g., costs associated depending on a minimum number of items of interest. Such costs may include only those costs associated with transferring one or more items from a receiving entity to a purchasing entity. Alternatively, the enterprise/institution for certain items may pre-empt such negotiations and declare, by fiat, the transfer protocol. This fiat may take the form of a set of pre-conditions that may be assigned rankings or priorities higher than either the source or the destination entities.

Truncating negotiations may be based on a pre-determined number of iterations, the convergence rate of the iterations, assessment of the need of the purchasing entity by the enterprise/institution for the one or more items, or either entity withdrawing its interest. The notification module 308 may be used to present the results or outcomes of the negotiations module 318.

It may be entirely beneficial to the entity offering the one or more items to dispose of them as a matter of convenience, and not profit. One entity may wish to dispose of its items should the storage space or costs are deemed excessive. Items near the end of their shelf life (expiration date) may be offered on the internal online marketplace. Such items may be expensive to dispose of properly, or alternatively, they might include a donation to some charity; or a tax write-off. Such items might be CRT's, e-waste, or process chemicals.

It is the enterprise/institution that may benefit most if both sides are equally satisfied. Alternatively, the enterprise/institution may specify or control the importance of the benefit to one side, or the other, or it may be a zero-sum game. There are costs associated with storage and perhaps maintenance of surplus items or spare parts. Benefits may not only accrue to one side, but the other side as well, to the overall benefit of the enterprise/institution. This may be unlike a typical commercial marketplace environment where maximizing profit, or minimizing costs may be the more common drivers in negotiations.

An additional module that may be present in system 300 is that of the preferences module 316 of the set of modules 222(A and/or B) residing in memory 240(A and/or B) of either of system 200 and/or 300 depicted respectively in FIGS. 2 and 3. This module may provide preferences for the agents/users, either the agents that enter the information into one or more databases, or the agents that are interested in the potential offerings found in the one or more databases, or the agent responsible for the disposition of the items. Other options addressable by the preferences module 316 may be the language of use, technological thesauri, communication modes, or source subsidiary pre-selection; a particular type of dictionary applicable to the search to be performed by the query module 310. Other parameters to be set may be automatic use of wildcards, specific entities/subsidiaries or databases to be queried.

Additionally, an administration module 314 of FIG. 3 may be present to facilitate the settings of tasks associated with the bureaucracy/maintenance of the online internal marketplace such as user privileges, database updates, database entries, a common format for database entries, listings, a resource to resolve problems associated with the systems and methods presented herein, and a resource for questions regarding use of the systems and methods.

FIG. 4 is a block diagram of an example computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 1). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the example embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 222(A and/or B) of FIG. 2 may be loaded into system memory 416.

In some examples, system memory 416 may store and/or load an operating system 440 for execution by processor 414. In one example, operating system 440 may include and/or represent software that manages computer hardware and software resources and/or provides common services to computer programs and/or applications on computing system 410. Examples of operating system 440 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Ethernet, Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 442.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

As illustrated in FIG. 4, computing system 410 may also include at least one display device 424 coupled to I/O controller 420 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424. As illustrated in FIG. 4, example computing system 410 may also include at least one input device 428 coupled to I/O controller 420 via an input interface 430. Input device 428 generally represents any type or form of input device capable of providing input, either computer or human generated, to example computing system 410. Examples of input device 428 include, without limitation, a camera, a keyboard, a pointing device, a speech recognition device, variations or combinations of one or more of the same, and/or any other input device.

Additionally, or alternatively, example computing system 410 may include additional I/O devices. For example, example computing system 410 may include I/O device 436. In this example, I/O device 436 may include and/or represent a user interface that facilitates human interaction with computing system 410. Examples of I/O device 436 include, without limitation, a computer mouse, a keyboard, a monitor, a printer, a modem, a camera, a scanner, a microphone, a touchscreen device, variations or combinations of one or more of the same, and/or any other I/O device.

Communication interface 422 broadly represents any type or form of communication device or adapter capable of facilitating communication between example computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fiber Channel interface adapters, Ethernet adapters, or the like. Communication interface 422 may also allow computing system 410 to engage in distributed or remote computing. For example, communication interface 422 may receive instructions from a remote device or send instructions to a remote device for execution.

In some examples, system memory 416 may store and/or load a network communication program 438 for execution by processor 414. In one example, network communication program 438 may include and/or represent software that enables computing system 410 to establish a network connection 442 with another computing system (not illustrated in FIG. 4) and/or communicate with the other computing system by way of communication interface 422. In this example, network communication program 438 may direct the flow of outgoing traffic that is sent to the other computing system via network connection 442. Additionally, or alternatively, network communication program 438 may direct the processing of incoming traffic that is received from the other computing system via network connection 442 in connection with processor 414.

Although not illustrated in this way in FIG. 4, network communication program 438 may alternatively be stored and/or loaded in communication interface 422. For example, network communication program 438 may include and/or represent at least a portion of software and/or firmware that is executed by a processor and/or Application Specific Integrated Circuit (ASIC) incorporated in communication interface 422.

As illustrated in FIG. 4, example computing system 410 may also include a primary storage device 432 and a backup storage device 443 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid-state drive, a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium, of a non-transient nature, containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the example embodiments described and/or illustrated herein. Additionally, or alternatively, one or more of the example embodiments described and/or illustrated herein may be implemented in firmware and/or hardware. For example, computing system 410 may be configured as an Application Specific Integrated Circuit (ASIC) adapted to implement one or more of the example embodiments disclosed herein.

Figure 5:
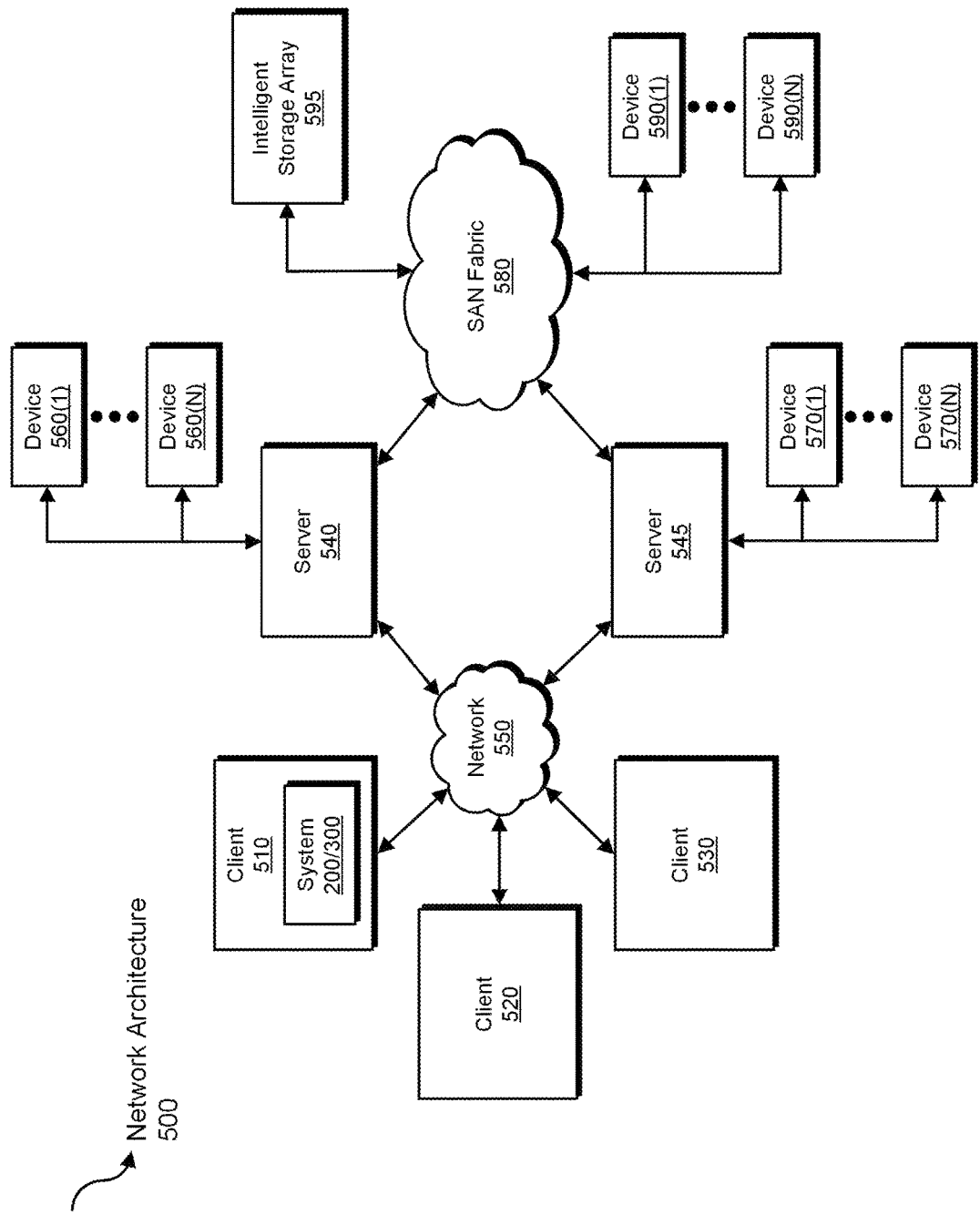
FIG. 5 is a block diagram of an example computing network capable of implementing one or more of the embodiments described and/or illustrated herein.

FIG. 5 is a block diagram of an example network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 1). All or a portion of network architecture 500 may also be used to perform and/or be a means for performing other steps and features set forth in the instant disclosure.

Client systems 510, 520, and 530 generally represent any type or form of computing device or system, such as example computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 200 from FIG. 2 and/or that of system 300 of FIG. 3.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 550, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to example computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the example embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an example method for notifying a client of unreceived notifications on a server.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures may be implemented to achieve the same functionality.

In some examples, all or a portion of example system 200 in FIG. 2 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 200 in FIG. 2 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 200 in FIG. 2 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules 222(A and/or B) and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

EXAMPLES

By way of example and not limitation, example embodiments of the present disclosure include the following:

Example 1

A computer-implemented method to facilitate a transfer of an item from a source subsidiary of an enterprise/institution to an entity, the method including: identifying the item in an internal private online marketplace of the enterprise/institution using one or more characteristics of the item; generating a transfer protocol for the item between the source subsidiary and the entity including one or more pre-conditions of at least one of the enterprise/institution, the entity, or the source subsidiary; and communicating or distributing or providing the transfer protocol to, or executing the one or more pre-conditions of the transfer protocol by, at least one of the enterprise/institution, the source subsidiary, or the entity.

Example 2

The computer-implemented method of Example 1, in which the one or more characteristics are stored in a database.

Example 3

The computer-implemented method of Example 2, in which the identifying of the item includes a user, representing the entity, querying the database using the one or more characteristics as search criteria.

Example 4

The computer-implemented method of Example 1, in which the entity is a destination subsidiary of the enterprise/institution, an external private online marketplace, an external public online marketplace, or a non-profit entity.

Example 5

The computer-implemented method of Example 1, in which the one or more characteristics of the item include at least one of the following: one or more constituents of the item, a function of the item, one or more identity markings, a quantity of the item, one or more condition metrics, a location of the item, one or more images of the item, a date of first use, a date of last use, a size or dimension, and one or more cost metrics, in which the one or more identity markings include at least one of a SKU, an OEM information, a manufacturer's identification or logo, an operational range, a model number, or an IMEI.

Example 6

The computer-implemented method of Example 5, in which the one or more condition metrics include operability, legacy, spare, defective, unused, outmoded, in which operability includes one of non-operable, partially operable, or fully operable.

Example 7

The computer-implemented method of Example 1, in which the identifying of the item includes: receiving one or more images containing the item; processing the one or more images to determine at least one characteristic of the item of the one or more characteristics; and providing the at least one characteristic of the item in a query of the internal private online marketplace and/or comparing the one or more images, or portions thereof, with stored images, or portions thereof, from a database of images to identify the item with at least one of the stored images.

Example 8

The computer-implemented method of Example 1, in which the one or more pre-conditions of the transfer protocol between the source subsidiary and the entity include at least one of an ownership re-assignment of the item, a transfer of responsibility for the item, a budgetary transfer of the item, a purchase of the item, an identification as to an internal entity responsible for the relocation transfer, an identification as to the internal entity responsible for the one or more cost metrics, an identification as to the internal entity responsible for the transfer of the item to the second internal marketplace, an identification as to the internal entity responsible for the transfer to a non-profit entity, or an identification as to the internal entity responsible for the budgetary transfer; in which the entity is a destination subsidiary of the enterprise/institution; and in which the internal entity is at least one of the source subsidiary, the destination subsidiary, or the enterprise/institution.

Example 9

The computer-implemented method of Example 1, in which the item is a constituent of a system/subsystem or is attached thereto; in which the one or more characteristics include at least one of a function of the system/subsystem, one or more images of the item or of the system/subsystem, a date of first or last use of the system/subsystem, at least one identity marking of the system/subsystem, a quantity of the system/subsystem, one or more condition metrics of the system/subsystem, one or more locations of the system/subsystem, or one or more cost metrics of the system/subsystem; in which the at least one identity marking includes one or more of an internal identification, a SKU, an OEM ID, a manufacturer's identification or logo, a model number, a size or dimension, an operational range or an IMEI; and in which the transfer protocol is generated for the system/subsystem containing the item.

Example 10

The computer-implemented method of Example 9, in which the entity is a destination subsidiary of the enterprise/institution; and in which the one or more pre-conditions of the transfer protocol between the source subsidiary and the destination subsidiary include at least one of an ownership re-assignment of the system/subsystem, a transfer of responsibility for the system/subsystem, a budgetary transfer of the system/subsystem, a purchase of the system/subsystem, an identification as to an internal entity responsible for the relocation transfer, an identification as to the internal entity responsible for the one or more cost metrics, an identification as to the internal entity responsible for the transfer of the system/subsystem to the second internal marketplace, an identification as to the internal entity responsible for the transfer to a non-profit entity, or an identification as to the internal entity responsible for the budgetary transfer, in which the internal entity is at least one of the source subsidiary, the destination subsidiary, or the enterprise/institution.

Example 11

The computer-implemented method of Example 9, in which the one or more cost metrics include at least one of a cost for a given quantity of the system/subsystem that satisfies the one or more condition metrics, a cost for administrative actions, or a cost associated with a relocation transfer.

Example 12

The computer-implemented method of Example 9, in which the one or more condition metrics include at least one of defunct, defective, spare, legacy, unused, outmoded, an operability of the item, an operability of one or more constituents of the item, or an operability of the system/subsystem or portions thereof; in which the operability includes one of non-operable, partially operable, or fully operable.

Example 13

A system for an internal private online marketplace of an enterprise/institution, the system including: a query module, stored in memory, configured to identify within at least one database an item or a system/subsystem including the item possessed by a source subsidiary of the enterprise/institution, using one or more characteristics entered by a user representing a destination subsidiary of the enterprise/institution; a notification module, stored in memory, configured to provide notifications from one or more modules of the system to at least one of the source subsidiary, the destination subsidiary, or the enterprise/institution; a user-interface module, stored in memory, configured to provide to the user one or more interactive functions within the system including at least a graphical user-interface; a user-authorization module, stored in memory, configured to provide the user with one or more levels of authorization within the system, in which a level of authorization includes at least access to the at least one database, or access to one or more tasks of at least one other module of the system; an administration module, stored in memory, configured to provide options within the system of the internal private online marketplace, in which the options include at least one of user privileges, a help resource, problem-resolution of the system, and/or accessing the at least one database, in which the at least one database includes entries at least one of images, listings, image processing steps, one or more pre-conditions, addresses of subsidiaries or other entities, contact information, and/or updates, and in which the entries of the at least one database include one or more characteristics of items or of systems/subsystems available in the internal private online marketplace; a preferences module, stored in memory, configured to provide an agent representing at least one of the source subsidiary, the enterprise/institution, or the destination subsidiary with one or more preferences available within the system, in which the one or more preferences include language selection, technological thesauri, communication modes, or source subsidiary selection; a component identification module, stored in memory, configured to access at least one of a pre-trained convolutional neural network, a pre-trained support vector machine, an optical character recognition system, or a pre-trained semantic segmentation, which processes one or more images of the item or of the system/subsystem to identify one or more characteristics or identity markings to be used as search criteria input to the query module; a transfer protocol module, stored in memory, configured to generate a transfer protocol including the one or more pre-conditions provided by at least one of the enterprise/institution, the source subsidiary, or the destination subsidiary; a negotiations module, stored in memory, configured to accommodate or to facilitate an exchange of proposals for the item or for the system/subsystem between a first agent representing the source subsidiary and a second agent representing the destination subsidiary, in which the exchange is terminated when the transfer protocol is attained, achieved, or fixed or when the exchange of proposals has reached a maximum number of iterations; in which the one or more pre-conditions of at least one of the enterprise/institution, the source subsidiary, or the destination subsidiary have precedence; and at least one processor that hosts the internal private online marketplace including at least a set of modules, the set including the query module, the notification module, the transfer protocol module, the user-interface module, the user-authorization module, the administration module, the component identification module, the preferences module, and the negotiations module, in which the at least one processor executes at least one module of the set.

Example 14

The system of Example 13, in which the component identification module is further configured to perform a comparison of each image of the one or more images, or portions thereof, of the desired item or of the system/subsystem with one or more database images, or portions thereof, of entries of items or of systems/subsystems available in the internal private online marketplace to identify one or more most probable matches therebetween, in which the comparison includes one- and/or two-dimensional cross-correlations.

Example 15

The system of Example 13, in which the one or more of characteristics of the item or of the system/subsystem include at least one of the following: one or more characteristics of the system/subsystem which includes at least the item, one or more condition metrics of the item or of the system/subsystem, a size or a dimension of the item or of the system/subsystem, a date of first use of the item or of the system/subsystem, a date of last use of the item or of the system/subsystem, one or more locations of the item or of the system/subsystem, or one or more cost metrics of the item or of the system/subsystem, and in which the one or more identity markings include at least one of a SKU, a manufacturer's identification or logo, an operational range, an IMEI, a model number, one or more integrated chips, or a circuit design.

Example 16

The system of Example 15, in which the one or more cost metrics include at least one of the following: a cost for a given quantity of the item or of the system/subsystem that satisfies the one or more condition metrics, a cost for administrative actions, or a cost for a relocation transfer.

Example 17

The system of Example 15, in which the one or more condition metrics include at least one of a level of operability of the item or of the system/subsystem, legacy, spare, unused, defective, or outmoded, in which the level of operability includes non-operable, partially operable, or fully operable.

Example 18

The system of Example 13, in which the one or more pre-conditions of the transfer protocol include at least one of a relocation transfer of the item or of the system/subsystem from the source subsidiary to the destination subsidiary, a transfer of the item or of the system/subsystem to an external marketplace, an ownership re-assignment of the item or of the system/subsystem, a transfer of responsibility for the item or of the system/subsystem, a transfer of the item or of the system/subsystem to the second internal marketplace, a transfer of the item or of the system/subsystem to a non-profit external entity, a budgetary transfer of the item or of the system/subsystem, an outright purchase of the item or of the system/subsystem, an identification as to an internal entity responsible for the relocation transfer, an identification as to the internal entity responsible for the each one of the one or more cost metrics, an identification as to the internal entity responsible for the transfer of the item or of the system/subsystem to the second internal marketplace, an identification as to the internal entity responsible for the transfer to the non-profit external entity, an identification as to the internal entity would be responsible for the budgetary transfer, in which the internal entity includes at least one of the enterprise/institution, the source subsidiary, or the destination subsidiary.

Example 19

A non-transitory computer-readable medium including one or more computer-readable instructions that, when executed by at least one processor of a computing device, cause the computing device to: identify, by a destination subsidiary of an enterprise/institution in an internal private online marketplace, using one or more characteristics, an item or a system/subsystem containing the item possessed by a source subsidiary of the enterprise/institution; generate a transfer protocol for the item or the system/subsystem containing the item between the destination subsidiary and the source subsidiary consistent with one or more pre-conditions of at least one of the enterprise/institution, the destination subsidiary, or the source subsidiary; and communicate the transfer protocol to, or perform the one or more pre-conditions of the transfer protocol by, at least one of the enterprise/institution, the source subsidiary, or the destination subsidiary.

Example 20

The non-transitory computer-readable medium of Example 19, in which the one or more characteristics are stored in a database.

Example 21

The non-transitory computer-readable medium of Example 19, in which the one or more characteristics of the item or the system/subsystem containing the item include at least one of the following: one or more constituents of the item or of the system/subsystem containing the item, a function of the item, one or more identity markings of the item, a quantity of the item or of the system/subsystem containing the item, one or more condition metrics of the item or of the system/subsystem containing the item, a location of the item or of the system/subsystem containing the item, one or more images of the item or of the system/subsystem containing the item, a date of first use of the item or of the system/subsystem containing the item, a date of last use of the item or of the system/subsystem containing the item, a size or dimension of the item or of the system/subsystem containing the item, and one or more cost metrics of the item or of the system/subsystem containing the item, in which the one or more identity markings include at least one of a SKU, an OEM information, a manufacturer's identification or logo, an operational range, a model number, or an IMEI; and in which one or more condition metrics of the item or of the system/subsystem containing the item includes at least one of legacy, spare, defective, unused, or outmoded.

Example 22

The non-transitory computer readable medium of Example 19 in which the identify step further includes: receiving one or more images containing the item or of the system/subsystem containing the item; processing the one or more images to determine the one or more characteristics of the item or of the system/subsystem containing the item and identifying the item or the system/subsystem containing the item using the one or more characteristics as search criteria in the internal private online marketplace and/or comparing the one or more images, or portions thereof, with stored images, or portions thereof, from a database of images to identify the item or the system/subsystem containing the item in at least one of the stored images.

Example 23

A computer-implemented method to facilitate a transfer of a system/subsystem present in an internal private online marketplace of an enterprise/institution from a source subsidiary of the enterprise/institution to a destination subsidiary of the enterprise/institution, the method including: identifying, by an agent of the destination subsidiary of the enterprise/institution, an item located on, within, or attached to a system/subsystem available in the internal private online marketplace using one or more characteristics, the one or more characteristics include at least one of a function of the item and/or of the system/subsystem, one or more images of the item and/or of the system/subsystem, dates of first and/or last use of the item and/or of the system/subsystem, identity markings of the item and/or of the system/subsystem, quantities of the item and/or of the system/subsystem, one or more condition metrics of the item and/or of the system/subsystem, one or more locations of the item and/or of the system/subsystem, and one or more cost metrics of the item and/or of the system/subsystem, in which the identity markings of the item and/or of the system/subsystem include one or more of internal identification, a SKU, an OEM ID, a manufacturer's identification or logo, a model number, a size, a date of source use, a date of last use, an operational range, or an IMEI; generating a transfer protocol between the source subsidiary and the destination subsidiary for the system/subsystem, in which the transfer protocol includes one or more pre-conditions established at least by one of the enterprise/institution, the source subsidiary, or the destination subsidiary; and communicating the transfer protocol to, or executing the transfer protocol by, at least one of the enterprise/institution, the source subsidiary, or the destination subsidiary.

Example 24

The computer-implemented method of Example 23, in which the transfer protocol further includes at least one of a relocation transfer of the system/subsystem, a listing of the system/subsystem to an external marketplace, or to an alternative internal marketplace, or to a non-profit entity, an ownership re-assignment of the system/subsystem, a transfer of responsibility for the item, a budgetary transfer of the system/subsystem, or an outright purchase of the system/subsystem.

Example 25

The computer-implemented method of Example 23, in which the one or more cost metrics include a given quantity of the system/subsystem that satisfies a set of condition metrics.

Example 26

The computer-implemented method of Example 23, in which the one or more condition metrics include at least one of a level of operability of the system/subsystem or of one or more constituents of the system/subsystem, in which the level of operability includes non-operable, partially operable, or fully operable.

Example 27

The computer-implemented method of Example 23, in which the pre-conditions of the transfer protocol include at least one of a relocation transfer of the item or of the system/subsystem from the source subsidiary to the destination subsidiary, a transfer of the item or of the system/subsystem to an external marketplace, an ownership re-assignment of the item or of the system/subsystem, a transfer of responsibility for the item or of the system/subsystem, a transfer of the item or of the system/subsystem to the second internal marketplace, a transfer of the item or of the system/subsystem to a non-profit external entity, a budgetary transfer of the item or of the system/subsystem, an outright purchase of the item or of the system/subsystem, an identification as to an internal entity responsible for the relocation transfer, an identification as to the internal entity responsible for the each one of the one or more cost metrics, an identification as to the internal entity responsible for the transfer of the item or of the system/subsystem to the second internal marketplace, an identification as to the internal entity responsible for the transfer to the non-profit external entity, an identification as to the internal entity would be responsible for the budgetary transfer, in which the internal entity includes at least one of the enterprise/institution, the source subsidiary, or the destination subsidiary.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their declensions or conjugations), as used in the specification and claims, are interchangeable with and have the same meaning as the word "comprising."

As used herein, the term "includes" and its variants are to be read as open terms that mean "includes, but is not limited to." The term "or" is to be read as "and/or" unless the context clearly indicates otherwise. The term "based on" is to be read as "based at least in part on." The terms "one embodiment," "one example," "an example," and "an embodiment" are to be read as "at least one example." The term "another embodiment" is to be read as "at least one other embodiment." The terms "first," "second," "third" and the like may refer to different or same objects.

The following publications are hereby incorporated herein by reference:

Patent Literature: U.S. Pat. Nos. 7,382,897B2, 8,756,233B2, 8,111,923B2, 8,873,812B2, 8,494,285B2, WO2016197303A1.

Non-Patent Literature (General References):

DuBuc (2011), 'A Review of Algorithms for Segmentation,' Chap. 2, Image Segmentation, Ed. P.-G. Ho, InTech, 15-54.

Canny (1986), 'A Computational Approach to Edge Detection,' IEEE Trans. Pattern Anal. Mach. Intell., PAMI-8(6), 679-698.

Kovesi (2003), 'Phase Congruency Detects Corners and Edges,' The Australian Pattern Recognition Society, Proc. DICTA, 309-318.

Duda et al. (2001), Unsupervised Learning and Clustering, Wiley, ISBN 0471056693.

Mori et al. (1999), Optical Character Recognition, Wiley, ISBN 047130819-6.

Hereinunder it is claimed:

1. A computer-implemented method for an internal private online marketplace (IPOM), the method comprising:
a destination entity locating an identified item in the IPOM of an enterprise/institution using one or more characteristics of a desired item, in which a subset of the one or more characteristics are image-derived characteristics obtained by:
receiving from the destination entity one or more images containing said desired item,
processing at least one image of the one or more images to determine at least one image-derived characteristic, the processing comprising:
deriving a plurality of marginal distributions for the at least one image of said desired item, determining from each marginal distribution of the plurality of marginal distributions a set of representative values comprising a plurality of a mean, a median, a mode, a first-order intensity moment, and one or more higher-intensity moments,
forming a feature vector comprising the set of representative values, and
processing the feature vector with a neural network that has been trained with similarly defined representative values determined from template images, in which output of the neural network is at least one of the image-derived characteristics comprising a logo or one or more alphanumeric characters;
providing the one or more characteristics in a query of the IPOM; and
locating the identified item in the IPOM, possessed by a source entity, in which characteristics of the identified item correlate at least a probable correlation with the one or more characteristics of said desired item,
wherein at least one pre-condition between the source entity, the destination entity, and the enterprise/institution is established upon locating the identified item in the IPOM, the at least one pre-condition comprising a transfer of responsibility for the identified item, or an identification as to which entity, destination or source, is responsible for a relocation of the identified item.

2. The computer-implemented method of claim 1, in which the destination entity is one of an external online marketplace, a subsidiary of the enterprise/institution, or a non-profit entity.

3. The computer-implemented method of claim 1, in which at least one of the one or more characteristics of said desired item comprises a constituent of said desired item, a function of said desired item, a condition metric of said desired item, a potential source location of said desired item, a date of first use and/or last use of said desired item, a size or dimension of said desired item, operating ranges of said desired item, or an identity marking of said desired item, in which the identity markings comprises at least one of a SKU, an OEM ID, a manufacturer's identification or logo, a serial number, a model number, or an IMEI.

4. The computer-implemented method of claim 3, in which the condition metric of said desired item is one of defunct, legacy, unknown, spare, partially defective, refurbished, or unused.

5. The computer-implemented method of claim 1, in which said desired item is a constituent of a device or is attached thereto, in which at east one of the one or more characteristics comprise a function of the device, a date of first and/or of last use of the device, a condition metric of the device, and at least one identity marking of the device, in which the at east one identity marking of the device comprises a SKU, an OEM ID, a manufacturer's identification or logo, a model number, a size or dimension, a serial number, an operational range, or an IMEI.

6. A-system for an internal private online marketplace (IPOM), the system comprising:

at least one memory;
a user-interface module, stored in the at least one memory, comprising instructions configured:
  to provide a user with a graphical user-interface comprising an ability to receive at least user-provided characteristics and/or image-derived characteristics of a desired item,
  to provide the user-provided and/or image-derived characteristics to a query module of the system,
  to provide notifications to the user of at least results regarding a query using the query module, in which the user represents one of a destination entity, a source entity, or an enterprise/institution that provides the IPOM, and
  to receive one or more images of said desired item, in which the one or more images are stored in at least one database of the system and/or are processed by a component identification module of the system to identify one or more image-derived characteristics of said desired item;
the query module, stored in the least one memory, comprising instructions configured to locate in the IPOM for the destination entity an identified item possessed by the source entity, by receiving the user-provided characteristics and/or image-derived characteristics of said desired item and correlating the user-provided and/or image-derived characteristics with one or more characteristics stored in the at least one database for items listed in the IPOM to locate the identified item that possesses a probable correlation value with said desired item, and to notify a transport protocol module of the system of the location of the identified item;
a user-authorization module, stored in at least one memory, comprising instructions configured to provide the user accessing the IPOM with one or more levels of authorization within the system, in which a level of authorization comprises
at least access to the at least one database, or access to one or more tasks of at least one other module of the system;
an administration module, stored in the at least one memory, comprising instructions configured to provide one or more options within the system comprising a help resource, problem resolution of the system, or accessing the at least one database, in which the at least one database comprises entries of at least one of stored images of items listed in the IPOM, one or more image-derived characteristics obtained from the images of items listed in the IPOM, template images, image processing and/or image pre-processing procedures, pre-conditions established upon formation of the IPOM between the entities, destination and source, and the enterprise/institution providing the IPOM, the one or more user-provided characteristics of the items listed in the IPOM, in which the one or more user-provided and/or image-derived characteristics of the items listed in the IPOM comprise at least one of a function, a date of first and/or of last use, a condition metric, one or more locations of potential source entities, and at least one identity marking, in which the at least one identity marking comprises a SKU, an OEM ID, a manufacturer's identification or logo, a model number, a size or dimension, a serial number, an operational range, or an IMEI;
a preferences module, stored in the at least one memory, comprising instructions configured to provide the user representing either of the entities, destination or source, or the enterprise/institution with one or more preferences available within the system comprising language selection, technological thesauri, communication modes, or source entity selection for any particular query using the query module and/or the user-interface module;
the component identification module, stored in the at least one memory, comprising instructions configured to:
  derive a plurality of marginal distributions for the at least one image of the one or more images of said desired item;
  determine from each marginal distribution of the plurality of marginal distributions a set of representative values comprising a plurality of a mean, a median, a mode, a first-order intensity moment, and one or more higher-intensity moments;
  form a feature vector comprising the set of representative values; and
  process the feature vector with a neural network that has been trained with similarly defined representative values determined from template images, in which output of the neural network is an image-derived characteristic comprising a logo or one or more alphanumeric characters;
the transfer protocol module, stored in the at least one memory, comprising instructions configured to notify, upon locating in the IPOM at least one identified item by the query module, at least one of the destination entity, the source entity, or the enterprise/institution of the pre-conditions established upon formation of the IPOM between the enterprise/institution and the entities, destination and source, the at least one pre-condition comprising a transfer of responsibility for the identified item, or an identification as to which entity, destination or source, is responsible for a relocation of the identified item; and
at least one processor that hosts the system of the IPOM provided by the enterprise/institution comprising at least a set of processor-implemented modules, the set comprising the query module, the user-interface module, the user-authorization module, the administration module; the component identification module, the preferences module, and the transfer protocol module, and in which the at least one processor has access to the at least one memory of the system.

7. The system of claim 6, in which the one or more of characteristics of the identified item or of the desired item additionally comprise identifiable integrated circuits comprised thereon or a circuit design thereof.

8. The system of claim 6, in which the condition metric of said desired item or of the device comprising said desired item comprises one of defunct, unknown, legacy, spare, unused, refurbished, or partially defective.

9. The system of claim 6, in which at least one of the pre-conditions established between the source entity, the destination entity, and the enterprise/institution upon formation of the IPOM, comprises a re-assignment of responsibility of the identified item, or an identification as to an entity, destination or source, responsible for the relocation transfer of the identified item.

10. A non-transitory computer-readable medium comprising one or more computer-readable instructions that, when executed by at least one processor of a computing device, cause the computing device to:
  locate, by a destination subsidiary of an enterprise/institution in an internal private online marketplace (IPOM), using one or more characteristics comprising user-provided and/or image-derived characteristics, an identified item or a device comprising the identified item in the IPOM and possessed by a source subsidiary of the enterprise/institution, in which the one or more image-derived characteristics are obtained by:

receiving one or more images of a desired item or of the device comprising said desired item, processing each of the one or more images to determine a set of image-derived characteristics of said desired item or of the device comprising said desired item comprising:

deriving a plurality of marginal distributions for each image of the one or more images;

extracting from each marginal distribution, of the plurality of marginal distributions for each image, a set of representative values comprising a plurality of a mean, a median, a mode, a first-order intensity moment, and one or more higher-intensity moments, forming a feature vector for each image comprising the set of representative values, and processing the feature vector for each image with a neural network that has been trained with similarly defined representative values determined from template images, in which output of the neural network is an image-derived characteristic for each image;

assemble the output of the neural network for each image of the one or more images into the set of image-derived characteristics of said desired item or of the device comprising said desired item;

provide the one or more characteristics in a query of the IPOM; and locate the identified item that possesses at least a majority of the one or more characteristics provided to the query of the IPOM of the desired item, wherein at least one pre-condition between the source entity, the destination subsidiary, and the enterprise/institution is established upon locating the identified item in the IPOM, the at least one pre-condition comprising a transfer of responsibility for the identified item, or an identification as to which entity, destination or source, is responsible for a relocation of the identified item.

11. The non-transitory computer-readable medium of claim 10, in which the one or more characteristics of said desired item or of the device comprising said desired item comprises at least one of identifiable integrated chips comprised thereon, a circuit design of the desired item or of the device thereof, one or more constituents of said desired item or of the device, a function of said desired item or of the device, a condition metric of said desired item or of the device, a potential location of said desired item or of the device, one or more images of said desired item or of the device, a date of first use and/or of last use of said desired item or of the device, a size or dimension of said desired item or of the device, and one or more identity markings of said desired item or of the device, in which the one or more identity markings comprise at least one of a SKU, an OEM ID, a manufacturer's identification or logo, an operational range, a model number, serial number, or an IMEI, and in which the condition metric comprises one of defunct, unknown, legacy, spare, unused, refurbished, or partially defective.

12. The computer-implemented method of claim 1, in which at least one of the source entity or the destination entity is a subsidiary of the enterprise/institution.

13. The computer-implemented method of claim 1, in which the at least one image is a sub-image which has been pre-processed by:

applying a symmetric kernel to the at least one image to form a second image of reduced noise;

enhancing edge detection of objects in the second image by applying an asymmetric kernel to the second image to form a third image;

thresholding the third image into a fourth image, in which intensity values of the third image above a first threshold are set to a first value in the fourth image, and intensity values of the third image below a second threshold are set to a second value in the fourth image;

segmenting the fourth image into at least one sub-image; and processing the sub-image as the at least one image of the one or more images to determine at least one image-derived characteristic from the sub-image.

14. The computer-implemented method of claim 13, in which the segmenting yields more than one sub-image with each sub-image possessing a similarity of morphological characteristics.

15. The system of claim 6, in which at least one of the source entity or the destination entity is a subsidiary of the enterprise/institution.

16. The system of claim 6, in which images of a new item to be listed in the IPOM are processed by the component identification module to identify one or more image-derived characteristics of the new item which are stored in the at least one database.

17. The system of claim 6, in which the at least one image is a sub-image which has been pre-processed by:

applying a symmetric kernel to the at least one image to form a second image of reduced noise;

enhancing edge detection of objects in the second image by applying an asymmetric kernel to the second image to form a third image;

thresholding the third image into a fourth image, in which intensity values of the third image above a first threshold are set to a first value in the fourth image, and intensity values of the third image below a second threshold are set to a second value in the fourth image;

segmenting the fourth image into at least one sub-image containing a distinct object; and processing the sub-image with the component identification module.

18. The system of claim 17, in which the segmenting yields more than one sub-image, with each sub-image possessing a similarity of morphological characteristics.

* * * * *